Oct. 10, 1950     J. H. STRESEN-REUTER     2,525,083
CARBURETOR
Filed Oct. 24, 1945     2 Sheets-Sheet 1
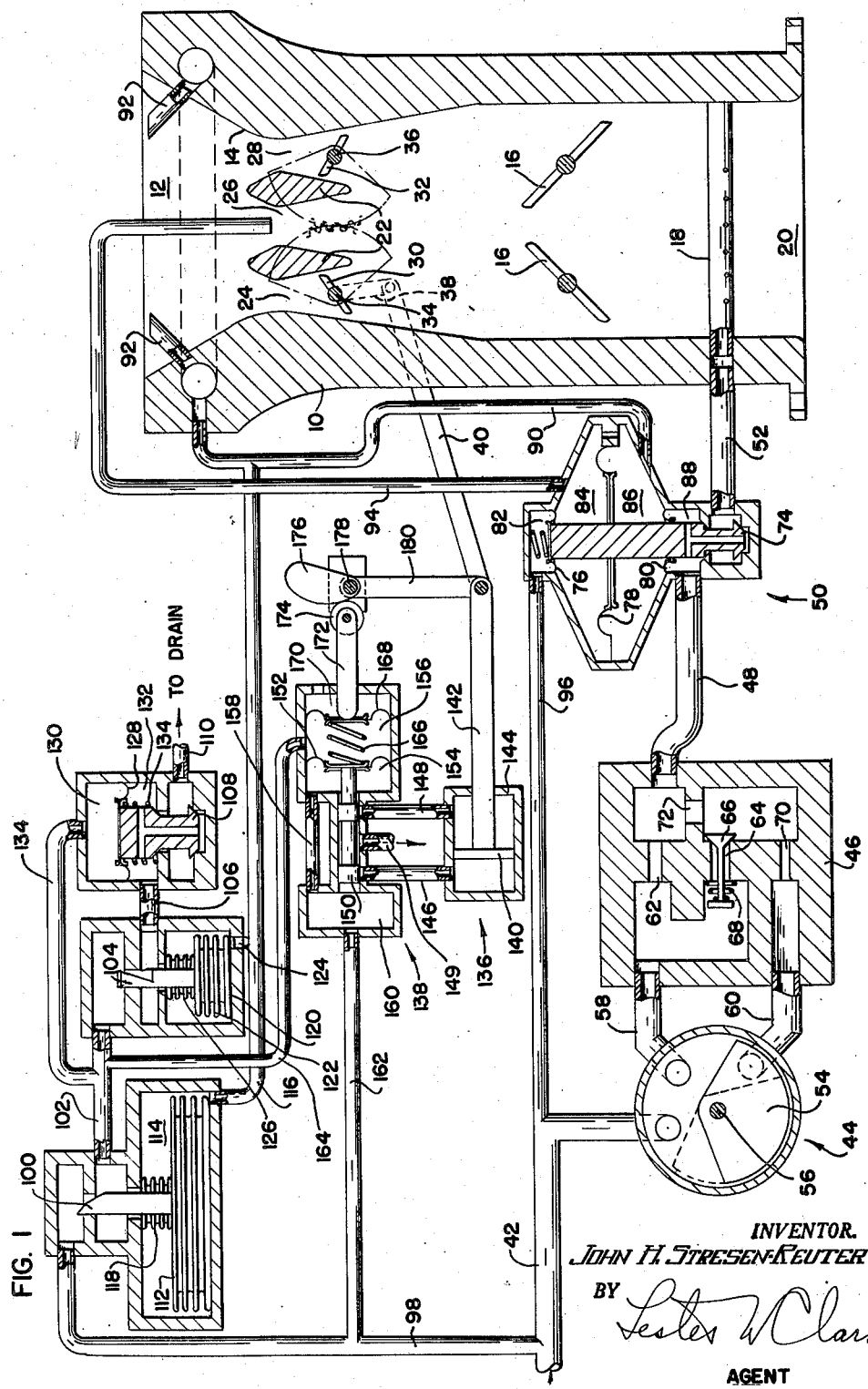
INVENTOR.
JOHN H. STRESEN-REUTER
BY Lester W Clark
AGENT

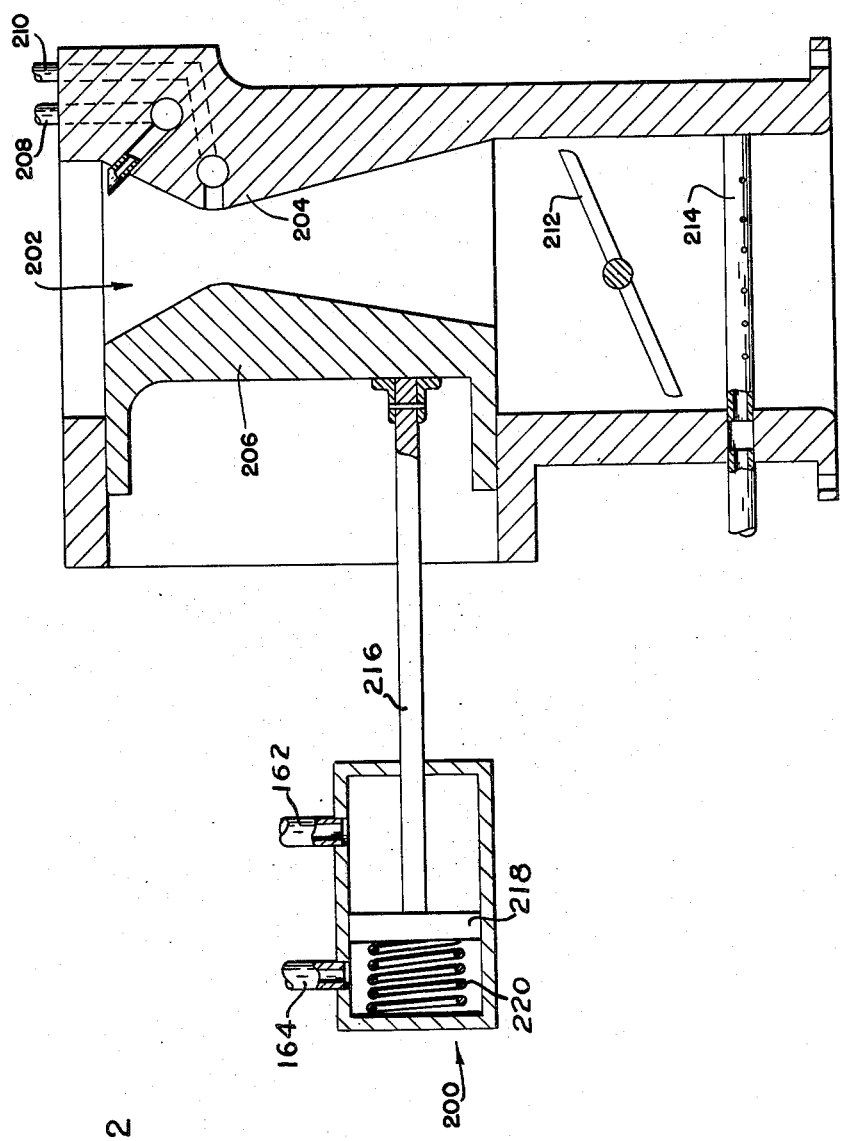

Patented Oct. 10, 1950

2,525,083

UNITED STATES PATENT OFFICE 2,525,083

CARBURETOR

John H. Stresen-Reuter, Golf, Ill., assignor, by mesne assignments, to Niles-Bement-Pond Company, West Hartford, Conn., a corporation of New Jersey Application October 24, 1945, Serial No. 624,180

14 Claims. (Cl. 261—39)

1

The present invention relates to carburetors for use on internal combustion engines, and particularly to carburetors for use on aircraft engines.

In carburetors for internal combustion engines, it is usual to provide some means for measuring the rate of air flow and to control the fuel flow in accordance with the measured rate of air flow so as to maintain the fuel-air ratio substantially constant. It is usual to provide either manual or automatic means, or both, for varying the fuel-air ratio within selected limits. The usual method of air flow measurement in such a carburetor involves the use of a Venturi meter. Venturi meters of fixed cross-sectional area are accurate only over a limited range of air flows. On large engines, such as those now in common use on aircraft, the range of variation of air flow between idling conditions and maximum power output conditions is very wide. If a fixed venturi is used, then it must be made large enough to measure the airflow at maximum power output. If so designed, it is too large to measure the air flow accurately under idling conditions. It has, therefore, been proposed to use a venturi of variable cross-section for measuring the air flow. Examples of such variable Venturi carburetors are shown and claimed in my co-pending applications, Serial No. 580,872, filed March 3, 1945, matured into Patent No. 2,468,416, issued April 26, 1949, and Serial No. 624,179, filed October 24, 1945, both of which are assigned to the assignee of the present application.

The density of the usual liquid fuel employed in an internal combustion engine is substantially constant, but the density of the air varies with its pressure and temperature. In order to maintain the constant fuel-air ratio, it is necessary to proportion the mass of air flowing per unit time to the mass of fuel flowing. The variations in air density must, therefore, be taken into account in measuring the air flow.

It is an object of the present invention to provide an improved carburetor of the variable Venturi type.

A further object is to provide improved variable Venturi means for measuring the flow of a fluid of variable density. A further object is to provide such variable Venturi flow measuring means in which the cross-sectional area of the venturi is varied in accordance with the pressure and temperature of the air flowing through it, in such a manner that the air pressure differential between the entrance and throat of the venturi is the same for a given air flow regardless of variations in the air density.

Another object is to provide an improved carburetor including an improved variable Venturi flow measurement means of the type described.

Other objects and advantages of the invention will become apparent from a consideration of the appended specification, claims and drawings in which:

Figure 1 shows, somewhat diagrammatically, a carburetor for an internal combustion engine embodying the principles of my invention, and Figure 2 illustrates a modified form of variable venturi which may be used in the carburetor of Figure 1.

Figure 1

Referring to the drawing, there is shown at 10 an air passage for a carburetor, thru which the air flows from an entrance 12, past a Venturi restriction 14, a pair of throttle blades 16, and a fuel discharge nozzle 18, to an outlet 20.

The body 10 is preferably of rectangular cross-section, and the venturi 14 is likewise rectangular. A pair of parallel bars 22 extend across the throat of the venturi 14 and divide the main venturi 14 into three smaller Venturi passages, 24, 26 and 28. Each of the outer venturis 24 and 28, is controlled by one of a pair of throttle blades 30, 32 which are mounted on shafts 34, 36. The shafts 34 and 36 are geared together. An arm 38 is attached to shaft 34 and connected to a link 40 by which the throttles 30 and 32 are operated.

In the embodiment of Fig. 1, the Venturi restriction 14, bars 22, and the three Venturi passages 24, 26, and 28, together with throttle blades 30 and 32 for varying the flow through the outer Venturi passages 24 and 28, are functionally substantially the equivalent of a single venturi of variable cross sectional area such as the venturi 202 of Fig. 2. This equivalence is readily apparent when throttle blades 30 and 32 are turned so as to stop flow through passages 24 and 28. In this case, all the air is required to flow through the central venturi 26, the rate of flow being measured as a predetermined function of the differential between the respective pressures at the entrance and at the throat of the Venturi passage 26. Similarly, when the throttle blades 30 and 32 are approximately vertical so as to cause minimum restriction of air flow through the outside Venturi passages 24 and 28, the rate of air flow is measurable in terms of the same pressure differential as before, somewhat in accordance with prevailing practice in design of carburetor air meters which include a pair of Venturi bars such as bars 22. In each case, the value of the differential corresponding to a given rate of air flow depends upon a meter coefficient which is a function of the actual or the effective area of flow through the Venturi passage or passages, but which coefficient is substantially constant regardless of the rate of air flow, when the area of flow remains constant. Because the pressure differential measured by the central Venturi passages 26 is a reliable measure of air flow in both of the two extreme cases specified, the differential corresponding to an intermediate position of throttle blades 30 and 32 is a similarly reliable measure within a range of operation predetermined in design.

The cross-sectional area of the central Venturi-passage 26 is fixed; similarly, the cross-sectional area of the outer venturis, as measured at their respective throats, are fixed and only the airflow thru the outer venturies 24 and 28 is variable by means of throttle blades 30 and 32. The function of blades 30 and 32, therefore, is to regulate the amount of air allowed to by-pass central venturi 26 so as to vary its apparent effective area, the apparent effective area of venturi 26 being increased as blades 30 and 32 open Venturi passages 24 and 28. The apparent effective area of venturi 26, as hereinafter referred to, is equivalent to the effective area of a single venturi providing the same pressure differential at any given rate of airflow as is obtainable from venturi 26 at a given position of throttle blades 30 and 32 and at the same rate of airflow.

Fuel enters the carburetor from a transfer pump or other source of fuel under a substantially constant pressure, and flows thru a conduit 42, a mixture control 44, a jet system 46, a conduit 48, a fuel regulator valve 50 and a conduit 52 to the discharge nozzle 18.

The mixture control 44 includes a disc valve 54 fixed on a rotatable shaft 56. When the valve 54 is in the full line position shown in the drawing, fuel may flow thru the mixture control unit to the jet system 46 only thru a conduit 58. Valve 54 may be moved by rotation of shaft 56 to the position shown in the dotted lines in the drawing, whereupon fuel may flow to the jet system 46 thru conduit 58 and thru another conduit 60. The full line position of the disc valve 54 is known as its "lean" position, and the dotted line position is known as its "rich" position. The valve 54 may also be moved to cut off position in which it prevents the flow of fuel thru either of the conduits 58 and 60.

Fuel entering the jet system thru the conduit 58 passes thru a jet or restriction 62. This fuel may also pass thru a restriction 64 controlled by a valve 66, which is biased to a closed position by a spring 68. Fuel entering the jet system thru conduit 60 passes thru a restriction 70. Fuel passing thru the restrictions 64 and 70 passes thru another fixed restriction 72.

The fuel regulator 50 includes a valve 74, operated by three flexible diaphragms 76, 78 and 80, which separate four expansible chambers 82, 84, 86 and 88.

The chamber 86 is connected thru conduit 90 to a plurality of impact tubes 92, located in the entrance 12, whose ends open in a direction to receive the impact of the entering air. The chamber 84 is connected thru a conduit 94 to the throat of the central small venturi 26. The chamber 82 is connected thru a conduit 96 to the fuel conduit 42 on the upstream side of the jet system 46. The chamber 88 is connected to the conduit 48 and, therefore, has in it fuel at the pressure existing on the downstream side of the jet system.

From the foregoing, it may be seen that the fuel regulator 50 operates to control the fuel flow so as to balance the pressure differential existing across the jet system 46 against the air pressure differential existing between the entrance and throat of the venturi. If the air pressure differential increases, the valve 74 is moved in an opening direction by the diaphragm 78, and this opening movement continues until the fuel pressure differential across the jet system is increased by an amount sufficient to balance the increased air pressure differential. It will be readily understood that an analogous operation takes place upon a decrease in air pressure differential.

A control conduit conducts fuel from the inlet conduit 42 thru a conduit 98, past a contoured valve 100, thru a conduit 102, past a contoured valve 104, thru a conduit 106 and past a valve 108 to a drain conduit 110. The drain conduit 110 may lead back to the fuel tank or to any other suitable location. If desired, the conduit 98 may be connected to a source of oil or any other substantially incompressible fluid maintained under a substantially constant pressure, instead of being connected as shown to the conduit 42.

The valve 100 is positioned by a flexible bellows 112, which is evacuated and mounted in a chamber 114 connected thru a conduit 116 to the conduit 90 leading to the impact tubes 92. The valve 100 is contoured, for reasons to be later described, so that the area of the restriction at valve 100 is proportional to the square root of the pressure in chamber 114. A sealing bellows 118 is used to keep the fluid in the control conduit out of the chamber 114, bellows 118 being of minimum possible effective area in order to minimize control of valve 100 as a function of pressures acting upon the sealing bellows. If desired this sealing bellows may be omitted and any other equivalent mechanism, such as a sliding fit seal, may be used. The valve 104 is positioned by a flexible bellows 120 mounted in a chamber 122, which is connected thru conduits 124 and 116 to the conduit 90 leading to the impact tubes 92. The bellows 120 is sealed and filled with a fluid having a substantial coefficient of thermal expansion, so that the valve is positioned in accordance with the temperature of the air in chamber 122. The valve 104 is contoured so that the area of the restriction controlled by it varies in accordance with the square root of the temperature in the chamber 122. A sealing bellows 126, similar to sealing bellows 118 is provided. If desired, it may be replaced by any other equivalent seal structure. If necessary, means may be provided for ventilating chamber 122 so that its temperature closely follows variations in the temperature in the air passage 10.

The valve 108 is operated by a diaphragm 128, which separates a pair of expansible chambers 130 and 132. The chamber 130 is connected thru a conduit 134 to the conduit 102 at the upstream side of valve 104. The chamber 132 receives fuel from conduit 106 at the pressure existing on the downstream side of valve 104. A spring 134 biases the valve 108 toward open position.

The valve 108 is operated by the diaphragm 128 to regulate the flow thru the control conduit so as to maintain a substantially constant pressure drop across the valve 104. If the pressure drop increases the valve moves towards closed position and decreases the flow so as to restore the pressure drop to its previous value.

The link 40 which sets the position of the auxiliary throttles 30 and 32 is operated by a servomotor 136 controlled by a valve mechanism generally indicated at 138, which responds to the pressure drop across the valve 100 in the control conduit.

The servomotor 136 includes a piston 140 connected to a piston rod 142 pivotally attached to link 40. The piston 140 moves in a cylinder 144. The opposite ends of the cylinder 144 are connected thru conduits 146 and 148 to the control valve mechanism 138.

The valve mechanism 138 includes a spool valve 150, which is provided with an extension at one end connected to a flexible diaphragm 152. The diaphragm 152 separates a pair of expansible chambers 154 and 156. The chamber 154 is connected thru a conduit 158, a chamber 160 and a conduit 162 to the conduit 98 upstream from valve 100. The chamber 156 is connected thru a conduit 164 to the conduit 102 downstream from valve 100.

A spring 166 is retained between the diaphragm 152 and the diaphragm 168. The diaphragm 168 separates chamber 156 from a chamber 170. A rod 172 pushes to the left on diaphragm 168 against the spring 166. The rod 172 carries a follower 174 which cooperates with a cam 176 fixed on a shaft 178, which is rotated by an arm 180. The arm 180 is pivotally attached to the piston rod 142. The cam 176 is contoured so that the position of rod 172, and hence the force of spring 166, varies substantially with the square of the apparent effective area of venturi 26 controlled by throttles 30 and 32.

The control valve mechanism 138 operates the valve 150 so as to vary the apparent effective Venturi throat area in proportion to the square root of the pressure differential acting on diaphragm 152 (which is the same as the pressure drop across valve 100). If the pressure differential acting on diaphragm 152 increases, the valve 150 is moved to the right, allowing fuel at high pressure to flow thru conduit 146 to the left end of cylinder 144, and connecting the right end of cylinder 144 thru conduit 148 to a drain conduit 149. The piston 140 therefore moves to the right, opening the auxiliary throttles 30, 32 and increasing the apparent effective throat area of venturi 26. This increase continues until the cam 176 has rebalanced the forces acting on valve 150. An analogous operation takes place when the pressure differential acting on diaphragm 152 decreases.

Since the rebalancing force provided by cam 176 is proportional to the square of the apparent Venturi throat area, it may be seen that the square of the apparent Venturi throat area is maintained proportional to the pressure drop across valve 100. In other words, the Venturi throat area is varied in accordance with the square root of the pressure drop across valve 100.

Figure 2

Figure 2 shows an arrangement wherein a servomotor 200, which corresponds to the servomotor 136 of Figure 1, operates a variable venturi generally indicated at 202. The variable venturi 202 is of rectangular cross-section and has a fixed side 204 and a movable side 206 which is connected by a rod 216 to piston 218 of the servomotor 200. In lieu of valve mechanism 138 with spring 166 variably loaded by cam 176, piston 218 is actuated directly by the difference in fluid pressures in conduits 162 and 164 ($P_1-P_2$) opposed by a spring 220 whose rate varies as the square of its deflection. Pressure connections 208 and 210 are provided to the entrance and throat of the variable venturi 202. The pressure connections 208 and 210 correspond to the conduits 90 and 94 of Figure 1, respectively.

The carburetor of Figure 2 is also provided with a throttle 212 and a fuel discharge nozzle 214 which correspond respectively to the throttle 16 and the discharge nozzle 18 of Figure 1.

Operation

Considering the control conduit which includes the valves 100, 104 and 108 in series, it may be seen that the rate of flow of fluid thru it may be measured by the pressure drop across any of the valves and the area of the restriction formed by the valve. The quantity of fluid flowing thru an orifice may be expressed by the equation $$Q = KA\sqrt{dp}$$

where K is a constant, A is the area of the orifice, and $dp$ is the pressure drop across the orifice. Therefore, it may be stated that $$K_1 A_p \sqrt{P_1 - P_2} = K_2 A_t \sqrt{P_2 - P_3} \qquad (1)$$

where $K_1$, $K_2$ are constants $A_p$ is the area of the orifice at the pressure responsive valve 100.

$A_t$ is the area of the orifice at the temperature responsive valve 104.

$P_1$ is the pressure at the inlet to the control conduit $P_2$ is the pressure in the control conduit between valves 100 and 104, and $P_3$ is the pressure in the control conduit downstream from the valve 104.

Equation 1 may be rewritten as follows:

$$\frac{P_1 - P_2}{P_2 - P_3} = K_3 \frac{A_t^2}{A_p^2} \qquad (2)$$

However, since $(P_2-P_3)$ is maintained constant by the action of valve 108, and since the areas of the orifices of the valves 100 and 104 are proportional to the square roots of the air pressure and temperature respectively, Equation 2 reduces to $$P_1 - P_2 = K_4 \frac{t}{p_1} \qquad (3)$$

where $t$ represents the air temperature and $p_1$ represents the air pressure at the air entrance.

In the valve mechanism 138, the force of spring 166 which is proportional to the square of the cross-sectional area of the air venturi is balanced against the pressure drop ($P_1-P_2$) therefore, it may be stated that $$A_2^2 = K_5(P_1 - P_2), \quad \text{or} \quad A_2 = K_6\sqrt{P_1 - P_2} \qquad (4)$$

where $A_2$ equals the effective Venturi throat area.

Substituting Equation 3 in Equation 4, we find that $$A_2 = K_7 \sqrt{\frac{t}{p_1}} \qquad (5)$$

It may be proved (see Equation 13 of my copending application, Serial No. 624,179, filed October 24, 1945) that the weight of air flowing thru a variable orifice can be expressed by the Equation $$W = K_{10} A_2 \sqrt{\frac{p_1}{t}(p_1 - p_2)} K_{11} \qquad (6)$$

where $p_1$ and $p_2$ are the pressures at the Venturi entrance and throat, respectively, and $t$ is the air temperature at the Venturi entrance.

Substituting the value for the area of the air venturi obtained in Equation 5 in Equation 6, it may be seen that $$W = K_{12} \sqrt{p_1 - p_2} \qquad (7)$$

Therefore, with the variable venturi controlled by the mechanism described, the weight of air flowing thru the venturi is directly proportional to the square root of the pressure drop between its entrance and throat. Similarly, the rate of fuel flow thru the jet system 46 is proportional to the square root of the pressure differential across it. Since these pressure differentials are balanced in the regulator 50 it may be seen that the fuel-air ratio is maintained constant regardless of variations in air density.

My invention has been illustrated as applied to a variable metering orifice of the Venturi type. However, it could with equal facility be applied to other types of variable area metering orifices, e. g., iris type orifices, etc.

While I have shown and described certain preferred embodiments of my invention, other modifications thereof will readily occur to those skilled in the art, and I therefore intend my invention to be limited only by the appended claims.

I claim as my invention:

1. Apparatus for measuring the flow of a variable density fluid, comprising a first conduit for said fluid, variable area orifice means in said conduit for producing two unequal pressures whose difference varies with the velocity of the fluid flowing through said conduit, motor means for varying the area of said orifice means, a source of substantially incompressible fluid under pressure, a control conduit connecting said source to a drain, two variable restrictions in series in said control conduit, means responsive to the pressure of the variable density fluid flowing through said first conduit for varying one of said variable restrictions, means responsive to the temperature of said variable density fluid flowing through said first conduit for varying the other of said variable restrictions, means responsive to the pressure drop across said other variable restriction for controlling the flow through said control conduit to maintain said pressure drop constant, means responsive to the pressure drop across said one variable restriction for controlling said motor means to vary the area of said orifice means so that the difference of said two unequal pressures is a measure of the mass of fluid flowing through said first conduit per unit time, and metering means responsive to the difference of said two pressures.

2. A carburetor for an internal combustion engine, comprising a conduit for combustion air flowing to said engine, variable area orifice means in said conduit for producing two unequal pressures whose difference varies with the velocity of the air flowing through said conduit, motor actuated means for varying the effective area of said orifice means, a source of substantially incompressible fluid under pressure, a control conduit connecting said source to a drain, two variable restrictions in series in said control conduit, means responsive to the pressure of the air flowing through said air conduit for varying one of said variable restrictions as the square root of said pressure, means responsive to the temperature of the air flowing through said air conduit for varying the other of said variable restrictions as the square root of said temperature, means responsive to the pressure drop across said other variable restriction for controlling the flow through said control conduit to maintain said pressure drop constant; means, responsive to the pressure drop across said one variable restriction, adapted to control said motor means so that it varies the effective area of said orifice means in proportion to the square root of the ratio of the temperature of the air flowing through said air conduit to the higher of the said two air pressures, whereby the difference of said two air pressures is a measure of the rate of mass air flow; and means responsive to said difference of said two pressures for controlling the flow of fuel to said engine as a function of said mass airflow.

3. Apparatus for measuring the flow of a variable density fluid, comprising a first conduit for said fluid, throttle means for controlling the flow through said conduit, a fixed venturi in said conduit for producing two unequal pressures whose difference varies with the velocity of the fluid flowing through said venturi, variable area by-pass means connected in parallel with said venturi for varying the relationship between said pressure differential and the volume of flow through said conduit, motor means for varying the area of said by-pass means, a source of substantially incompressible fluid under pressure, a control conduit connecting said source to a drain, two variable restrictions in series in said control conduit, means responsive to the pressure of the fluid flowing through said first conduit for varying one of said variable restrictions, means responsive to the temperature of the fluid flowing through said first conduit for varying the other of said variable restrictions, means responsive to the pressure drop across said other variable restriction for controlling the flow through said control conduit to maintain said pressure drop constant, means responsive to the pressure drop across said one variable restriction for controlling said motor means to vary the area of said by-pass means so that the difference of said two unequal pressures is a measure of the mass of fluid flowing through said first conduit per unit time and metering means responsive to the difference of said two pressures.

4. Apparatus for measuring the flow of a variable density fluid, comprising a first conduit for said fluid, throttle means for controlling the flow through said conduit, variable area Venturi means in said conduit for producing two unequal pressures whose difference varies with the velocity of the fluid flowing through said conduit, motor means for varying the area of said Venturi means, a source of substantially incompressible fluid under pressure, a control conduit connecting said source to a drain, two variable restrictions in series in said control conduit, means responsive to the pressure of the fluid flowing through said first conduit for varying one of said variable restrictions, means responsive to the temperature of the fluid flowing through said first conduit for varying the other of said variable restrictions, means responsive to the pressure drop across said other variable restriction for controlling the flow through said control conduit to maintain said pressure drop constant, means responsive to the pressure drop across said one variable restriction for controlling said motor means to vary the area of said Venturi means so that the difference of said two unequal pressures is a measure of the mass of fluid flowing through said first conduit per unit time, and metering means responsive to the difference of said two pressures.

5. A carburetor for an internal combustion engine, comprising a conduit for combustion air flowing to said engine, throttle means for controlling the flow of air through said conduit, a fixed venturi in said conduit for producing two unequal pressures whose difference varies with the velocity of the air flowing through said venturi, variable area by-pass means connected in parallel with said venturi for varying the relationship between said pressure differential and the velocity of flow through said conduit; motor actuated means for varying the area of said by-pass means, a source of substantially incompressible fluid under pressure, a control conduit connecting said source to a drain, two variable restrictions in series in said control conduit, means responsive to the pressure of the air flowing through said air conduit for varying one of said variable restrictions as the square root of said pressure, means responsive to the temperature of the air flowing through said air conduit for varying the other of said variable restrictions as the square root of said temperature, means responsive to the pressure drop across said other variable restriction for controlling the flow through said control conduit to maintain said pressure drop constant; means responsive to the pressure drop across said one variable restriction, adapted to control said motor means so that it varies the area of said by-pass means in such manner that the total effective area of said fixed venturi and said by-pass means is always proportional to the square root of the ratio of the temperature of the air flowing through said air conduit to the higher of the said two air pressures, whereby the difference of said two air pressures is a measure of the rate of mass air flow; and means responsive to said difference of said two pressures for controlling the flow of fuel to said engine as a function of said mass air flow.

6. A carburetor for an internal combustion engine, comprising a conduit for combustion air flowing to said engine, throttle means for controlling the flow of air through said conduit, variable area Venturi means in said conduit for producing two unequal pressures whose difference varies with the velocity of the air flowing through said conduit, motor actuated means for varying the effective area of said Venturi means, a source of substantially incompressible fluid under pressure, a control conduit connecting said source to a drain, two variable restrictions in series in said control conduit, means responsive to the pressure of the air flowing through said air conduit for varying one of said variable restrictions as the square root of said pressure, means responsive to the temperature of the air flowing through said air conduit for varying the other of said variable restrictions as the square root of said temperature, means responsive to the pressure drop across said other variable restriction for controlling the flow through said control conduit to maintain said pressure drop constant; means, responsive to the pressure drop across said one variable restriction, adapted to control said motor means to vary the effective area of said Venturi means in proportion to the square root of the ratio of the temperature of the air flowing through said air conduit to the higher of the said two air pressures, whereby the difference of said two air pressures is a measure of the rate of mass air flow; and means responsive to said difference of said two pressures for controlling the flow of fuel to said engine as a function of said mass air flow.

7. Apparatus for measuring the flow of a gas, comprising a first conduit for said gas, variable metering orifice means in said first conduit, control means for varying the effective area of said orifice means, a source of hydraulic fluid at superatmospheric pressure, a second conduit for the flow of fluid from said source, a restriction in said second conduit for controlling the flow therethrough; means responsive to the temperature and pressure of said gas for controlling the fluid pressure differential across said restriction so that the value of said differential may be expressed by the equation $$D = K\frac{t}{p}$$

wherein D is said differential, K is a constant, $t$ is the gas temperature and $p$ is the gas pressure; a motor responsive to said differential pressure for operating said area varying means, means actuated by said motor opposing said differential pressure and controlling said motor so that said area varying means maintains said effective area of said orifice means in predetermined relationship with the square root of the ratio of said gas temperature to said gas pressure, and means for measuring said gas pressure differential set up in said first conduit by said orifice means.

8. A carburetor for an internal combustion engine comprising: an air passage and a fuel supply to said passage, means adapted to control the rate of fuel flow to said passage in a definite, predetermined ratio to the velocity of air flow therethrough; a Venturi restriction in said passage having movable means for varying the effective area of said restriction directly as the square root of the ratio of the temperature to the pressure of the air entering said passage and thereby compensate the fuel/air ratio for variations in density of said air; and means for moving said movable means including hydraulic motor means controlled by a control means having separate devices, respectively responsive to the temperature and pressure of the air entering said passage, which operate conjointly on said control means.

9. A carburetor for an internal combustion engine comprising: an air supply passage having a Venturi restriction, with movable means for varying the effective area of said restriction, a fuel supply to said passage and means adapted to control the rate of fuel flow to said passage in a definite, predetermined ratio to the velocity of air flow through said restriction, a plurality of separate devices respectively responsive to the temperature and velocity pressure of the air entering said passage, and means, responsive to the coaction of said devices, for moving said movable means to vary the effective area of said restriction directly as the square root of the ratio of the temperature to the pressure of the air entering said passage and thereby compensate the fuel/air ratio for variations in density of said air.

10. A carburetor as in claim 9, wherein said moving means comprises hydraulic motor means actuated by fluid pressure from said fuel supply.

11. A carburetor as in claim 9, wherein said moving means comprises hydraulic motor means actuated by fluid pressure from a source separate from said fuel supply.

12. A carburetor as in claim 9, wherein said moving means comprises hydraulic motor means controlled by said devices.

13. A carburetor as in claim 8, wherein said movable means comprises a plurality of side walls, one of which is fixed and the other movable with respect to the first.

14. A carburetor as in claim 9, wherein said movable means comprises a plurality of side walls, one of which is fixed and the other movable with respect to the first.

JOHN H. STRESEN-REUTER.

REFERENCES CITED

The following references are of record in the file of this patent:

UNITED STATES PATENTS

| Number | Name | Date |
|---|---|---|
| 1,677,834 | Linderman | July 17, 1928 |
| 1,677,835 | Linderman | July 17, 1928 |
| 2,015,839 | Brown | Oct. 1, 1935 |
| 2,271,142 | Lippincott | Jan. 27, 1942 |
| 2,295,728 | Gess | Sept. 15, 1942 |
| 2,303,640 | Hogg | Dec. 1, 1942 |
| 2,399,079 | Udale | Apr. 23, 1946 |

FOREIGN PATENTS

| Number | Country | Date |
|---|---|---|
| 363,339 | Great Britain | June 13, 1930 |